(12) United States Patent
Ricart et al.

(10) Patent No.: US 11,537,197 B2
(45) Date of Patent: Dec. 27, 2022

(54) VEHICLE SYSTEM FOR PROVIDING ACCESS TO REMOVABLE VEHICLE COMPONENTS

(71) Applicant: Lear Corporation, Southfield, MI (US)

(72) Inventors: Raúl Ricart, Valls (ES); Antoni Ferré Fàbregas, Valls (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/110,669

(22) Filed: Dec. 3, 2020

(65) Prior Publication Data

US 2022/0179479 A1   Jun. 9, 2022

(51) Int. Cl.
*G06F 3/01*   (2006.01)
*G06T 19/00*   (2011.01)

(52) U.S. Cl.
CPC ............ *G06F 3/011* (2013.01); *G06T 19/006* (2013.01); *B60R 2300/20* (2013.01)

(58) Field of Classification Search
CPC .... G06F 3/011; G06T 19/006; B60R 2300/20
See application file for complete search history.

(56) References Cited

U.S. PATENT DOCUMENTS

| | | | |
|---|---|---|---|
| 5,255,184 A | 10/1993 | Hornick et al. | |
| 6,008,547 A | 12/1999 | Dobler et al. | |
| 6,081,044 A | 6/2000 | Anthofer et al. | |
| 6,565,119 B2 | 5/2003 | Fogle, Jr. | |
| 6,566,765 B1 | 5/2003 | Nitschke et al. | |
| 7,170,192 B2 | 1/2007 | Kazmierczak | |
| 9,333,880 B2 | 5/2016 | Farquhar et al. | |
| 9,383,872 B2 | 7/2016 | Yetukuri et al. | |
| 9,451,020 B2 | 9/2016 | Liu et al. | |
| 9,911,243 B2 | 3/2018 | Vats | |
| 10,147,325 B1 | 12/2018 | Copeland et al. | |
| 10,216,188 B2 | 2/2019 | Brady et al. | |
| 2001/0034656 A1* | 10/2001 | Lucas ............... | G06Q 10/087 705/26.81 |
| 2003/0046179 A1 | 3/2003 | Anabtawi et al. | |
| 2004/0249685 A1 | 12/2004 | Douglas | |
| 2005/0236899 A1 | 10/2005 | Kazmierczak | |
| 2006/0276960 A1 | 12/2006 | Adamczyk et al. | |

(Continued)

FOREIGN PATENT DOCUMENTS

| | | |
|---|---|---|
| CN | 104508913 A | 4/2015 |
| CN | 106063051 A | 10/2016 |

(Continued)

OTHER PUBLICATIONS

Depending U.S. Appl. No. 16/711,661, filed Dec. 12, 2019.

(Continued)

*Primary Examiner* — Terrell M Robinson
(74) *Attorney, Agent, or Firm* — Fishman Stewart PLLC

(57) ABSTRACT

A vehicle system for providing access to removable vehicle components may include one or more vehicles having customizable configurations and configured for selective connection with a plurality of removable components, an electronic device associated with a user, and/or a computer server configured to communicate with the electronic device. The electronic device may be configured to facilitate user selection of one or more removable components of the plurality of removable components for the one or more vehicles.

20 Claims, 12 Drawing Sheets

(56) References Cited

U.S. PATENT DOCUMENTS

| | | | |
|---|---|---|---|
| 2007/0260528 A1* | 11/2007 | Ly | G06Q 30/0641 |
| | | | 705/26.5 |
| 2010/0258626 A1 | 10/2010 | Watanabe et al. | |
| 2011/0137758 A1* | 6/2011 | Bienias | G06Q 30/0621 |
| | | | 705/27.2 |
| 2012/0101891 A1 | 4/2012 | Collier et al. | |
| 2012/0313395 A1* | 12/2012 | Newberg | B60N 3/001 |
| | | | 296/193.07 |
| 2013/0054279 A1 | 2/2013 | Sharp et al. | |
| 2014/0082580 A1* | 3/2014 | Bose | G06F 30/00 |
| | | | 716/133 |
| 2014/0164188 A1 | 6/2014 | Zabawa et al. | |
| 2014/0207338 A1* | 7/2014 | Healey | B60K 35/00 |
| | | | 701/1 |
| 2014/0214696 A1 | 7/2014 | Laughlin et al. | |
| 2014/0306500 A1 | 10/2014 | Dryburgh et al. | |
| 2015/0220244 A1* | 8/2015 | Vats | G06F 3/04845 |
| | | | 715/850 |
| 2015/0317568 A1 | 11/2015 | Grasso et al. | |
| 2016/0123793 A1* | 5/2016 | Kolich | G01G 19/4142 |
| | | | 177/136 |
| 2016/0261070 A1 | 9/2016 | Hsu et al. | |
| 2016/0264021 A1 | 9/2016 | Gillett | |
| 2016/0379631 A1 | 12/2016 | Wang et al. | |
| 2017/0103584 A1* | 4/2017 | Vats | G10L 15/22 |
| 2018/0029716 A1 | 2/2018 | Sieben | |
| 2018/0039917 A1 | 2/2018 | Buttolo et al. | |
| 2018/0072188 A1 | 3/2018 | Yamada | |
| 2018/0154799 A1 | 6/2018 | Lota | |
| 2018/0244175 A1 | 8/2018 | Tan | |
| 2018/0275648 A1 | 9/2018 | Ramalingam | |
| 2019/0012728 A1* | 1/2019 | Horn | G06F 3/04815 |
| 2019/0026886 A1 | 1/2019 | Ferguson et al. | |
| 2019/0035282 A1 | 1/2019 | Ferguson et al. | |
| 2020/0047641 A1 | 2/2020 | D'Eramo et al. | |
| 2020/0055423 A1 | 2/2020 | Prozzi et al. | |
| 2020/0171979 A1 | 6/2020 | Yetukuri et al. | |
| 2020/0257771 A1* | 8/2020 | Meaige | G06F 30/15 |

FOREIGN PATENT DOCUMENTS

| | | |
|---|---|---|
| CN | 106099449 A | 11/2016 |
| CN | 106887726 A | 6/2017 |
| DE | 102017202222 A1 | 10/2017 |
| DE | 102017114231 A1 | 1/2018 |
| JP | 2007310634 A | 11/2007 |
| JP | 2008158578 A | 7/2008 |
| JP | 2017135185 A | 8/2017 |
| WO | 18/144821 A1 | 8/2018 |

OTHER PUBLICATIONS

How to Use Amazon Garage to Find the Right Parts For Your Car; https://www.howtogeek.com/308262/how-to-use-amazon-garage-to-find-the-right-parts-for-your-car; accessed Nov. 16, 2020.

Part Finder All Categories; https://www.amazon.com/gp/part-finder; accessed Nov. 16, 2020.

Use the Automotive Part Finder; https://www.amazon.com/gp/help/customer/display.html?nodeId=201889610; accessed Nov. 16, 2020.

* cited by examiner

VEHICLE SYSTEM FOR PROVIDING ACCESS TO REMOVABLE VEHICLE COMPONENTS

TECHNICAL FIELD

The present disclosure generally relates to vehicle systems, including vehicle systems that may comprise one or more vehicles and an electronic device associated with a user.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some vehicle systems may be relatively complex and/or may not provide sufficient functionality. Some vehicle systems may not be configured for use with networks and/or ride-share interfaces.

There is a desire for solutions/options that minimize or eliminate one or more challenges or shortcomings of vehicle systems. The foregoing discussion is intended only to illustrate examples of the present field and is not a disavowal of scope.

SUMMARY

In embodiments, a vehicle system for providing access to removable vehicle components may include one or more vehicles having customizable configurations and configured for selective connection with a plurality of removable components, an electronic device associated with a user, and/or a computer server configured to communicate with the electronic device. The electronic device may be configured to facilitate user selection of one or more removable components of the plurality of removable components for the one or more vehicles.

With embodiments, a method of using a vehicle system may include displaying, on a display of the electronic device, an interactive vehicle model of a vehicle of the one or more vehicles, displaying, on the display, a plurality of models of the plurality of removable components configured for selective connection in a plurality of locations of the vehicle, adding a set of models of the plurality of models of the removable components to the interactive vehicle model in respective locations of the plurality of locations, changing a default orientation of at least one model of the set of models, and/or creating a customized vehicle design with the set of models.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
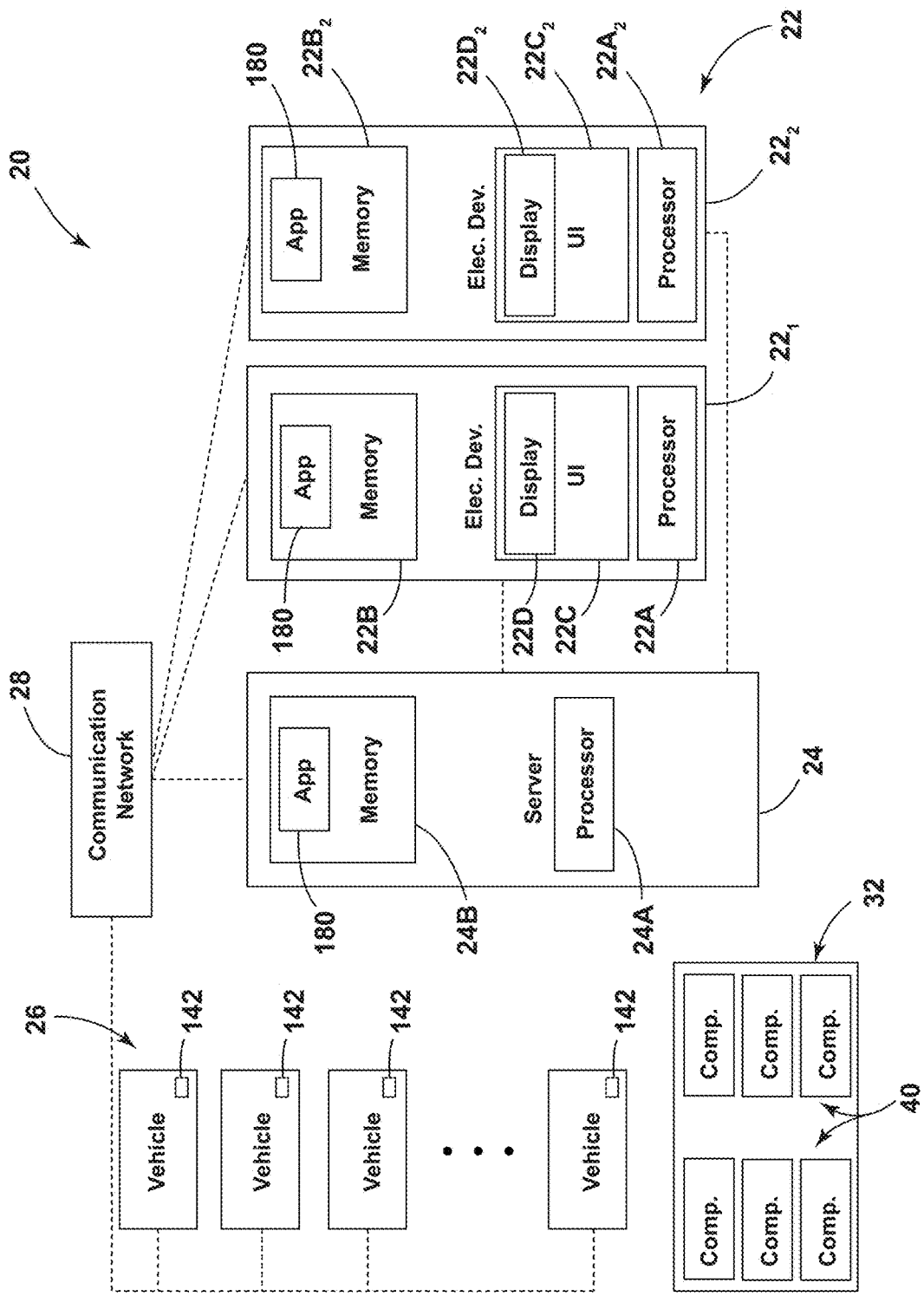
FIG. 1 is a diagram generally illustrating an embodiment of a vehicle system according to teachings of the present disclosure.

In embodiments, such as generally illustrated in FIG. 1, a vehicle system 20 may include one or more electronic devices 22 (e.g., electronic devices $22_1$, $22_2$) that may be associated with respective users, a computer server 24, one or more vehicles 26, and/or a communication network 28. The vehicle system 20 may, for example and without limitation, be configured for customizing the one or more vehicles and/or for providing access (e.g., temporary access) to the plurality of vehicles as customized by a user. Temporary access may, for example and without limitation, include a rental and/or use/operation for a period of time, such as a number of hours, days, and/or weeks, and may not include a transfer of ownership. For example, the one or more vehicles 26 may not be for sale. In some instances, the one or more vehicles 26 may include a vehicle or vehicles already owned by a user.

With embodiments, an electronic device 22, a computer server 24, and/or one or more vehicles 26 may be connected to a communication network 28. The communication network 28 may, for example and without limitation, include a cellular network, a global computer network, a local area network (LAN), a wide area network (WAN), and/or the internet, among others.

In embodiments, a vehicle 26 may include one or more of a variety of configurations. For example and without limitation, a vehicle 26 may include a land vehicle, a passenger car, a van, a sport utility vehicle (SUV), a crossover, a truck (e.g., a pickup truck, commercial truck, etc.), a bus, a watercraft, an aircraft (e.g., a plane, a helicopter, etc.), and/or a combination thereof (e.g., a vehicle for land and water, a vehicle for air and water, etc.), among others. With embodiments, such as generally illustrated in FIG. 2, a vehicle 26 may include one or more mounting surfaces 30 (e.g., a vehicle interior, a vehicle exterior, etc.) that may be configured for selective connection with one or more removable components 40.

Figure 2:
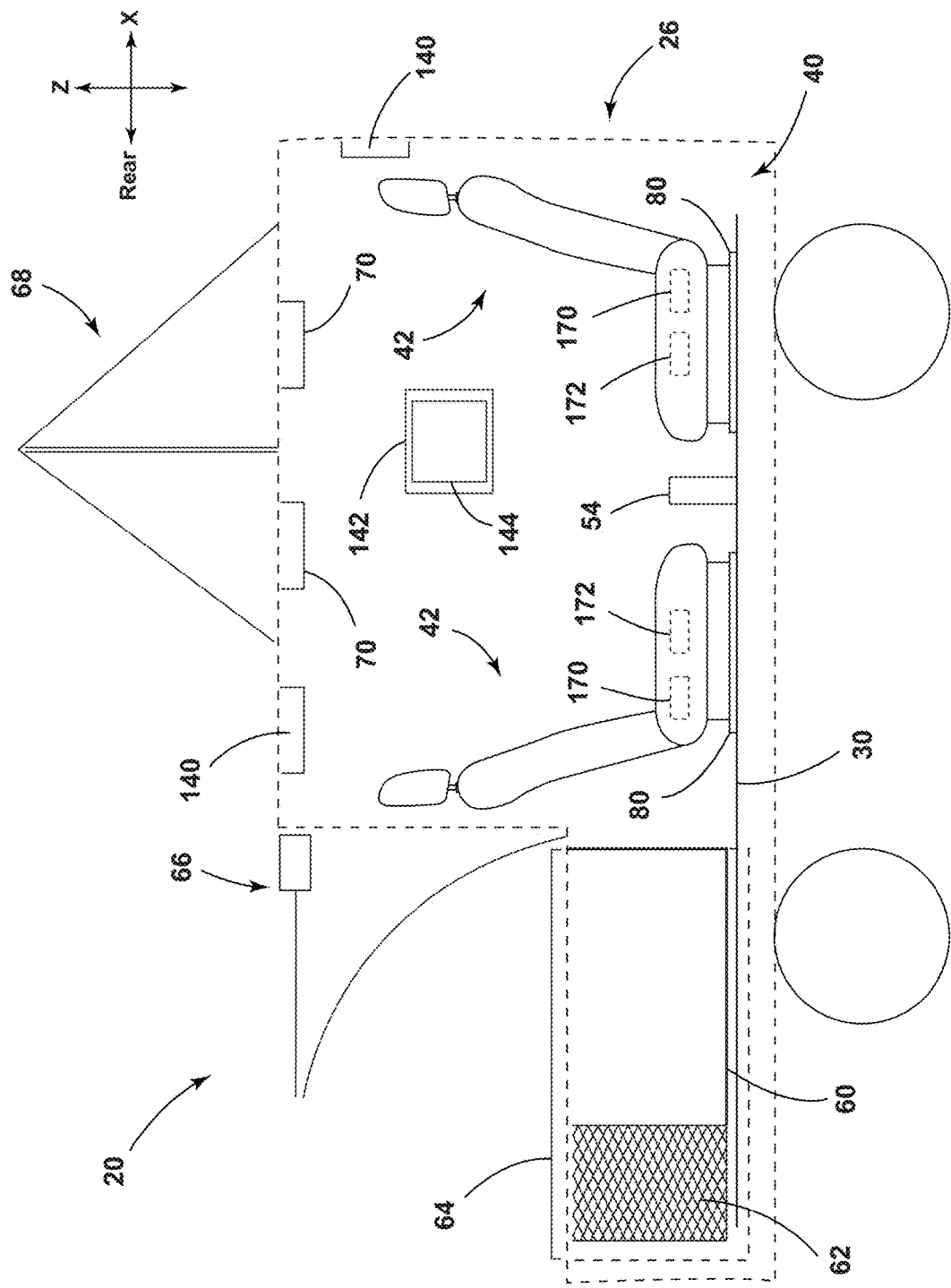
FIG. 2 is a side view of an embodiment of a vehicle of a vehicle system according to teachings of the present disclosure.
Figure 3:
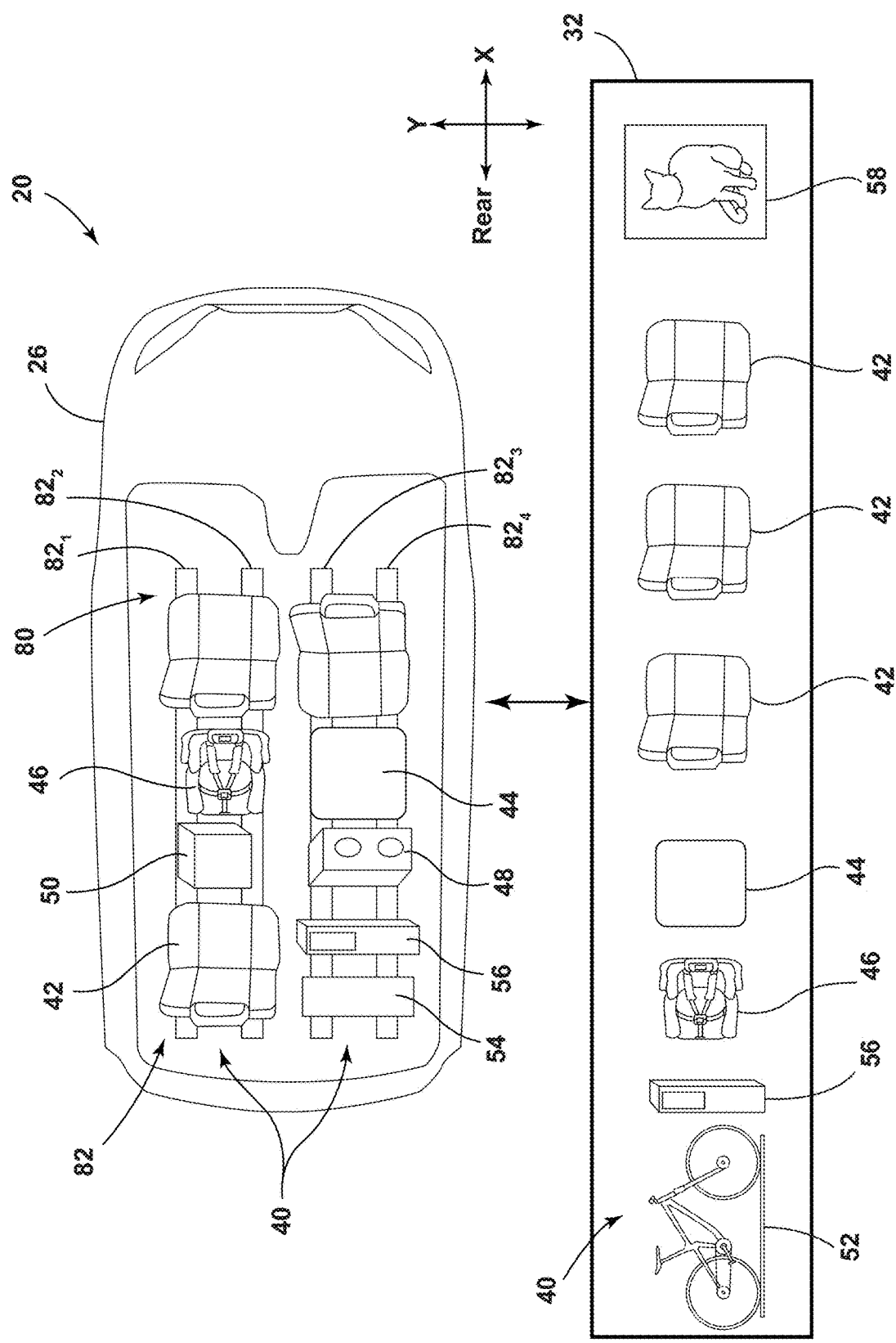
FIG. 3 is a top cross-sectional view generally illustrating an embodiment of a vehicle with a plurality of components and a storage facility with a plurality of components according to teachings of the present disclosure.

With embodiments, such as generally illustrated in FIGS. 2 and 3, removable components 40 may, for example and without limitation, include vehicle seats 42, tables 44, child seats 46 (e.g., car seats for children), power outlets 48 (e.g., AC outlets and/or DC outlets), appliances 50 (e.g., refrigerators, freezers, coffee makers, etc.), mounting racks 52 (e.g., bike racks, kayak racks, ski racks, etc.), consoles 54, lights 56, pet crates 58, truck bed liners 60, cargo managers 62 (e.g., dividers, nets, etc.), covers 64 (e.g., trunk covers, truck bed covers, etc.), awnings 66 (e.g., roll-up awnings at the rear of a vehicle), tents 68, and/or roofs 70 (e.g., hard and/or soft convertible tops), among others. Covers 64 and/or awnings 66 may, for example, cover portions of a vehicle 26 (e.g., a truck bed) and/or track assemblies 80 associated there with, and/or may extend beyond the vehicle 26. Removable components 40 may be configured for selective connection with, movement within, movement relative to, and/or removal from the vehicle interior and/or exterior. Removable components 40 may include electrical components (e.g., components with electrical loads/elements) and/or may include non-electrical components (e.g., without electrical loads/elements). Removable components 40 may, for example, be stored, at least temporarily, in a storage facility 32 (e.g., a warehouse, shed, etc.).

Figure 4:
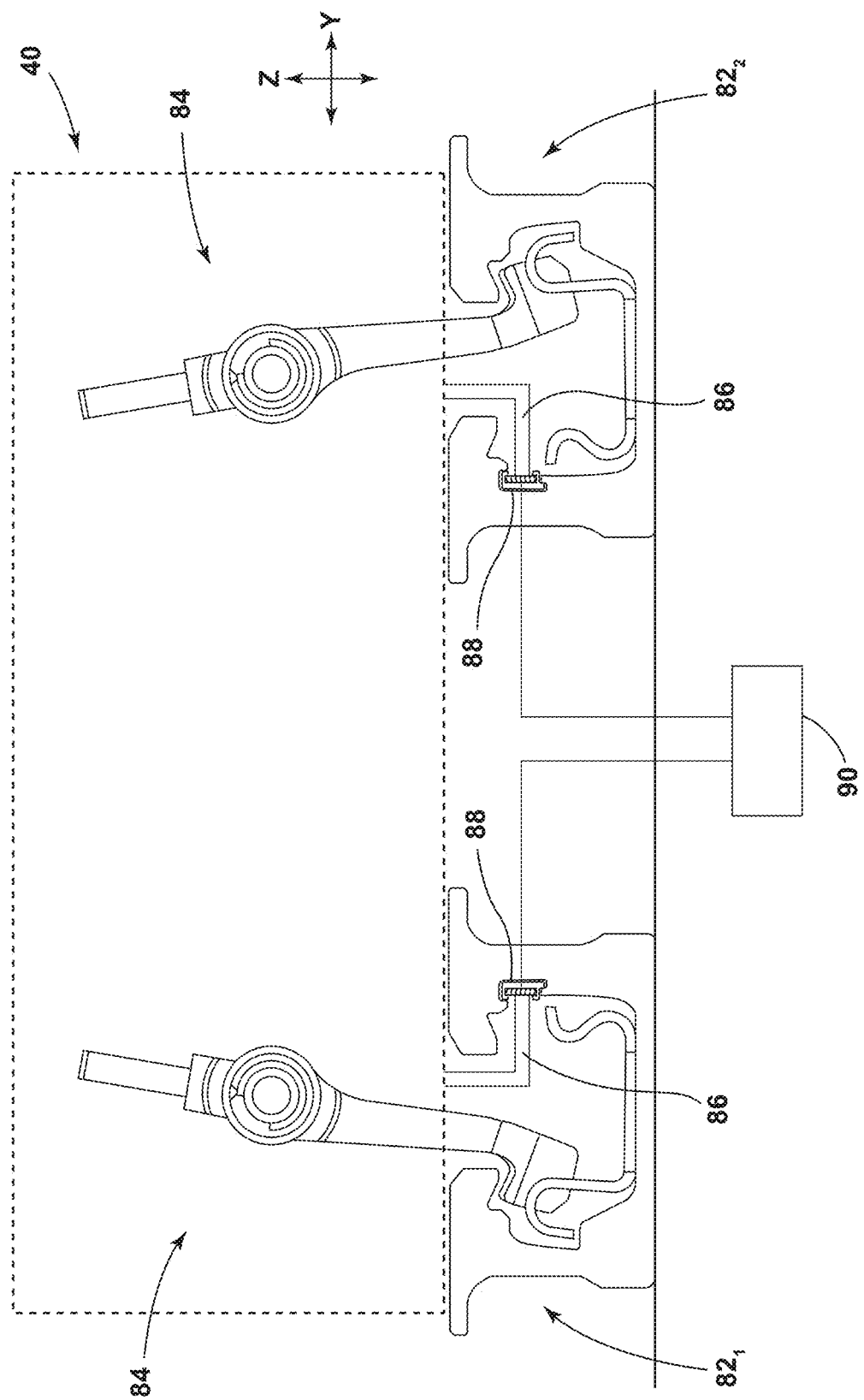
FIG. 4 is an end view of an embodiment of a track assembly of a vehicle and a removable component of a vehicle system according to teachings of the present disclosure.

With embodiments, such as generally illustrated in FIGS. 2-4, a vehicle 26 may include a track/rail assembly 80 that may be connected (e.g., fixed) to and/or in a mounting surface 30 of a vehicle 26. A track/rail assembly 80 may include one or more tracks 82, such as a first track $82_1$, a second track $82_2$, a third track $82_3$, and/or a fourth track $82_4$ that may extend substantially parallel to each other (e.g., in a longitudinal/X-direction), such as generally illustrated in FIG. 3. The tracks 82 may, for example, be spaced from each other, such as in a lateral direction of the vehicle 26 (e.g., a Y-direction) The one or more components 40 may, with some embodiments, be selectively/releasably connected to (e.g., mechanically and/or electrically), move (e.g., slide) along and relative to, and/or be removed from the mounting surface 30 via the track assembly 80, such as, in some examples, without additional or external tools (e.g., may be selectively secured to and removed in a Z-direction from the track assembly 80 in a plurality of positions/orientations along the track assembly 80).

With embodiments, a component 40 may, for example and without limitation, include one or more latches/anchors 84 that may be configured to selectively engage and/or contact the track assembly 80 to restrict or prevent movement of a component 40 in one or more directions (e.g., an X-direction and/or a Z-direction of the track assembly 80), and/or one or more electrical contacts 86 that may be configured to selectively contact a conductor 88 of a track assembly 80, such as to provide power from a power source 90 (e.g., a vehicle battery) to the component 40 (see, e.g., FIG. 4). The one or more latches/anchors 84 and/or the one or more electrical contacts may be actuated (e.g, rotated) between engaged/connected positions and disengaged/disconnected positions in one or more of a variety of ways, such as mechanically (e.g., via a lever/slider/cable, manually, etc.) and/or electronically (e.g., via an electric actuator/motor).

The one or more latches/anchors 84 and/or the one or more electrical contacts 86 may restrict insertion/removal of a component 40 from the track assembly 80 when in engaged/connected positions, and/or may not restrict insertion/removal of a component 40 when in disengaged/disconnected positions.

Figure 6B:
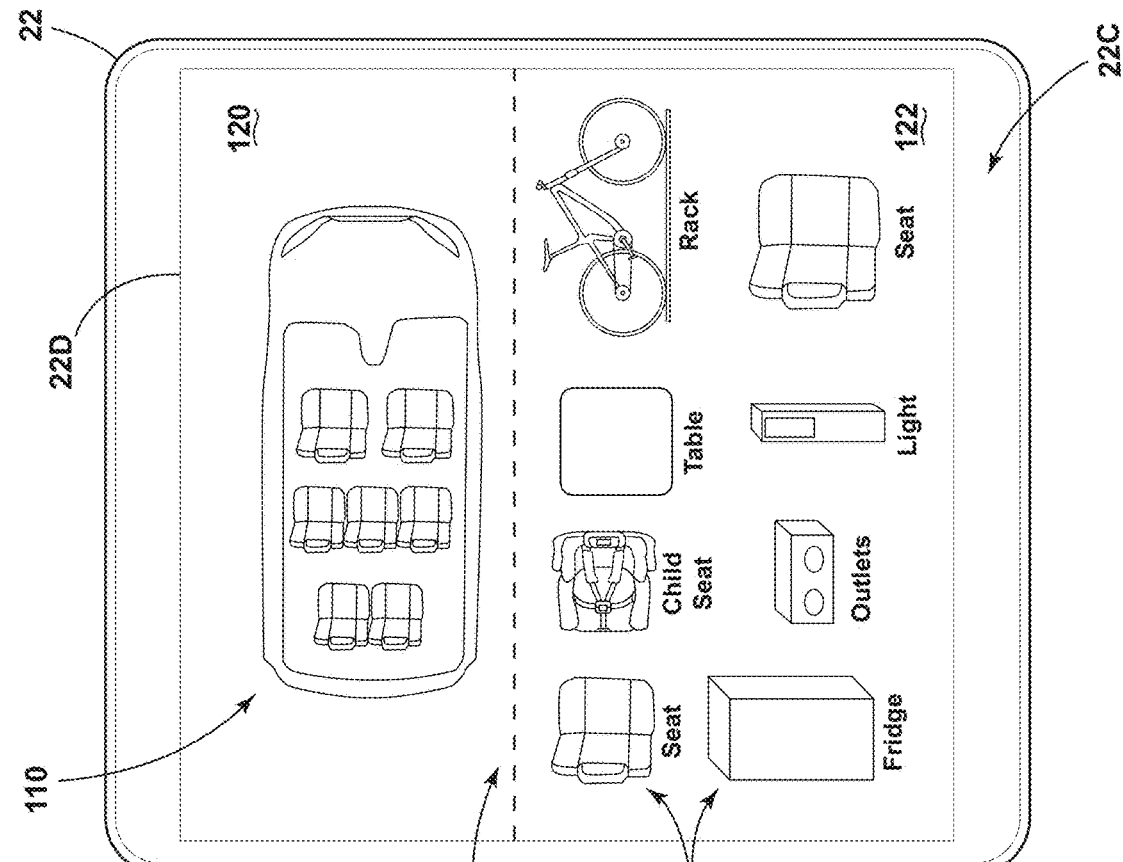

In embodiments, an electronic device 22 may include one or more of a variety of configurations. For example and without limitation, an electronic device 22 may include a mobile electronic device (e.g., a smartphone, tablet computer, laptop computer, etc.) (see, e.g., FIGS. 6A and 6C), a desktop computer (see, e.g., FIG. 6B), and/or a workstation, among others. As generally illustrated in FIG. 1, an electronic device 22 may include an electronic processor 22A, a memory 22B, and/or user interface 22C, which may include a display 22D. The electronic device 22 may be configured to provide (e.g., display) one or more virtual models 110 of the vehicles 26 and/or one or more virtual models 112 of the plurality of components 40 to a user, such as for selection by the user. The electronic device 22 may be associated with the user, which may, for example and without limitation, include being owned, leased, rented, possessed, borrowed, and/or used temporarily by the user. In embodiments, an electronic device 22 may, for example, be compatible with one or more operating systems (e.g., Windows, MacOS, Linux, Chrome, iOS, Android, etc.) and/or one or more browsers (e.g., Edge, Explorer, Chrome, Firefox, Safari, Opera, etc.).

Figure 5:
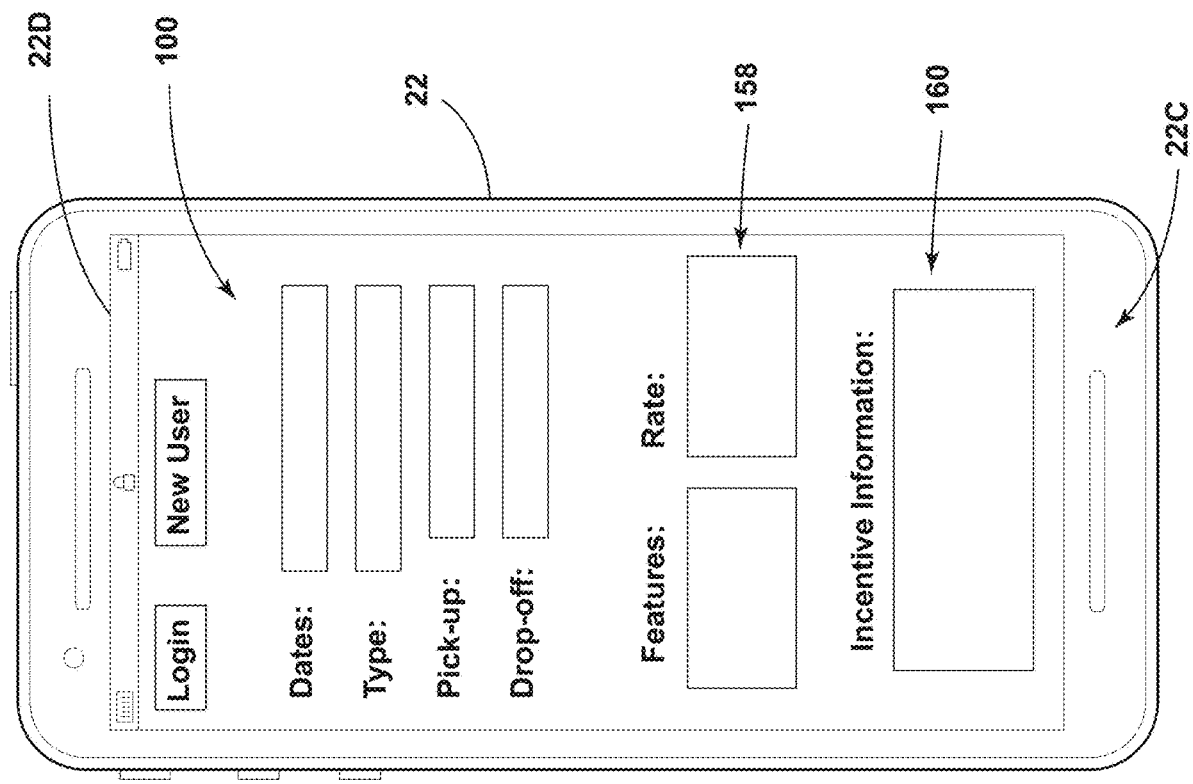
FIG. 5-9 are representations generally illustrating embodiments of electronic devices having displays according to teachings of the present disclosure.

With embodiments, an electronic device 22 may be configured to receive a user input 100 from the user, such a via a user interface 22C. The user input may, for example, include information regarding a temporary use/operation of a vehicle 26, such as a rental by a user. The information may, for example, include a vehicle type, rental dates/duration, pick-up location, and/or drop-off location, among other information (see, e.g., FIG. 5). The vehicle type may, for example and without limitation, include a vehicle class (e.g., subcompact, compact, midsize, full size, luxury, SUV, crossover, specialty, truck, van) and/or one or more features (e.g., permanent features), such as truck bed length and/or truck bed coatings. The user input may include login information for returning users and/or may include payment information.

In embodiments, user input may include a selection of removable components 40, such as via a list of removable components and/or via the virtual models 112 of removable components 40. The selection may include a selection of the virtual models 112, desired positions of the selected virtual models 112 (e.g., compatible positions), and/or desired orientations of the selected virtual component models 112. For example, the display 22D may be a touchscreen display and the user may interact with the touchscreen display to select (e.g., tap), move (e.g., drag), and/or change the orientation of (e.g., spin) the component models 112 (see, e.g., FIGS. 6A-7).

Figure 6A:
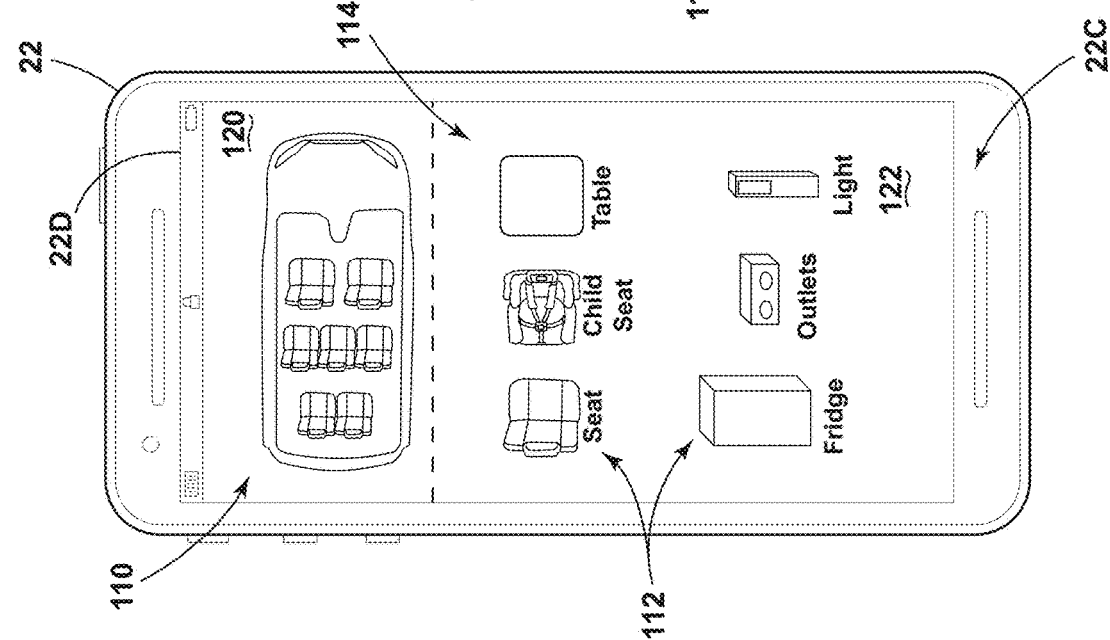
Figure 6C:
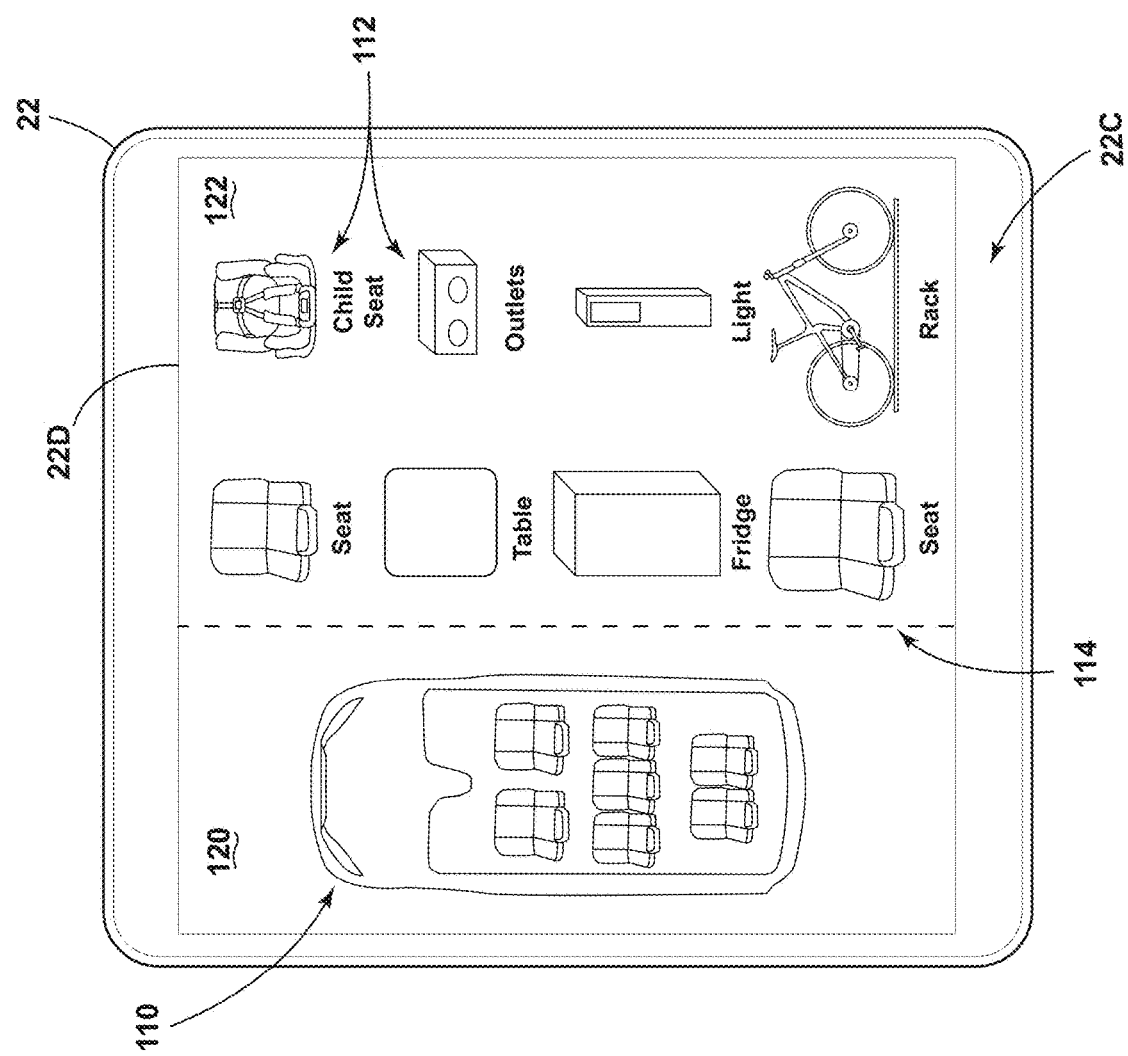
Figure 7:
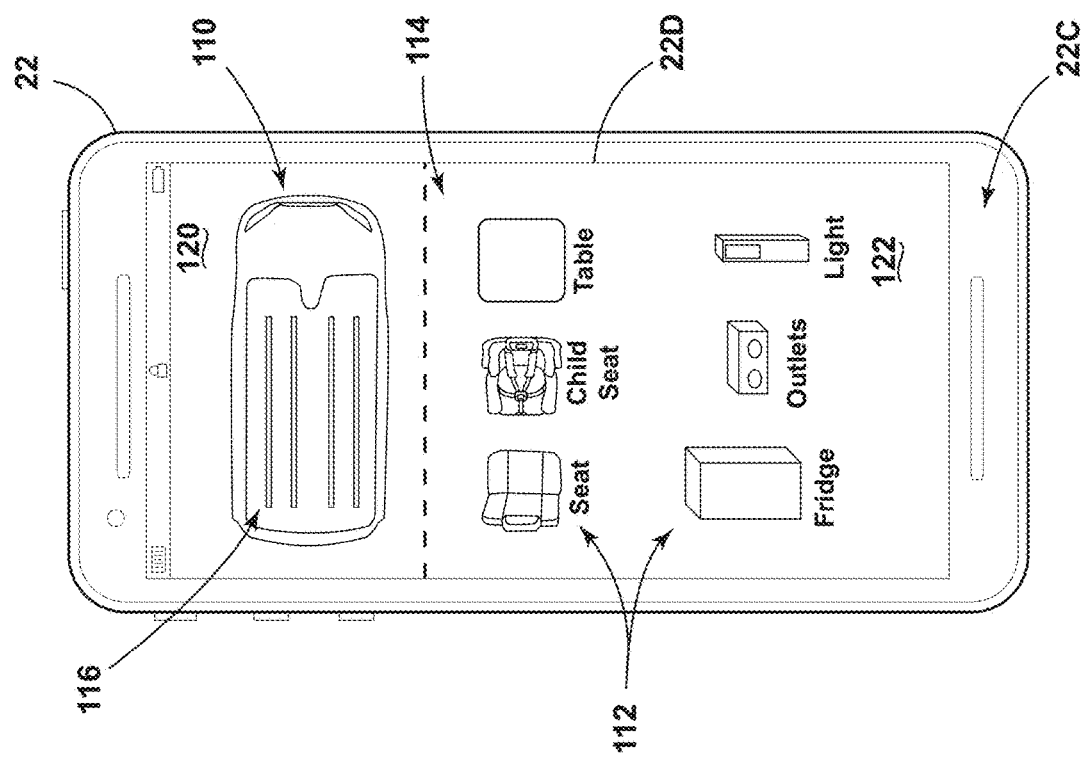

In embodiments, such as generally illustrated in FIGS. 6A-7, an electronic device 22 may be configured to provide (e.g., display) an interactive vehicle model 110 (e.g., a two-dimensional (2-D) and/or a three-dimensional (3-D) virtual model) of a vehicle 26 to the user, such as via the display 22D, which may facilitate receiving user input. The interactive vehicle model 110 may include a representation of the vehicle 26, the mounting surface 30, and/or a track assembly 80.

With embodiments, an electronic device 22 may be configured to display a library 114 of removable component models 112 to a user, such as via the user interface 22C. For example and without limitation, an electronic device 22 may be configured to display the library 114 of removable component models 112 on a second portion 122 of a display 22D, and/or configured to display an interactive vehicle model 110 on a first portion 120 of the display 22D, such as simultaneously.

In embodiments, an electronic device 22 may be configured to allow a user to select desired locations/positions of removable components models 112, such as to move removable component models 112 from a library 114 to the interactive vehicle model 110, to move removable component models 112 within/on the interactive vehicle model 110, and/or to move removable component models 112 from the interactive vehicle model 110 to a library 114. For example and without limitation, a user may drag (e.g., with a finger, a mouse, a stylus, an electronic pen, etc.) removable component models 112 from the library 114 of removable component models 112 in the second portion 122 to the interactive vehicle model 110 in the first portion 120, such as to add removable component models 112 to the interactive vehicle model 110. Additionally or alternatively, a user may drag removable component models 112 from the interactive vehicle model 110 to the library 114, such as to remove removable component models 112 from the interactive vehicle model 110. The electronic device 22 may be configured to allow a user to move removable component models 112 within the interactive vehicle model 110, such as by dragging the component models 112 to different positions on the interactive vehicle model 110. Additionally or alternatively, selecting desired locations/positions of removable component models may include a user clicking/tapping (e.g., with a finger, a mouse, a stylus, an electronic pen, etc.) removable component models 112 and then clicking/tapping again in a desired position/location (e.g., into the library 114, into/onto the interactive vehicle model 110, within the interactive vehicle model 110, etc.). The electronic device 22 may be configured to allow a user to change the orientation of component models 112, such as by dragging an edge/corner of a component model 112 in a generally circular motion.

Figure 8:
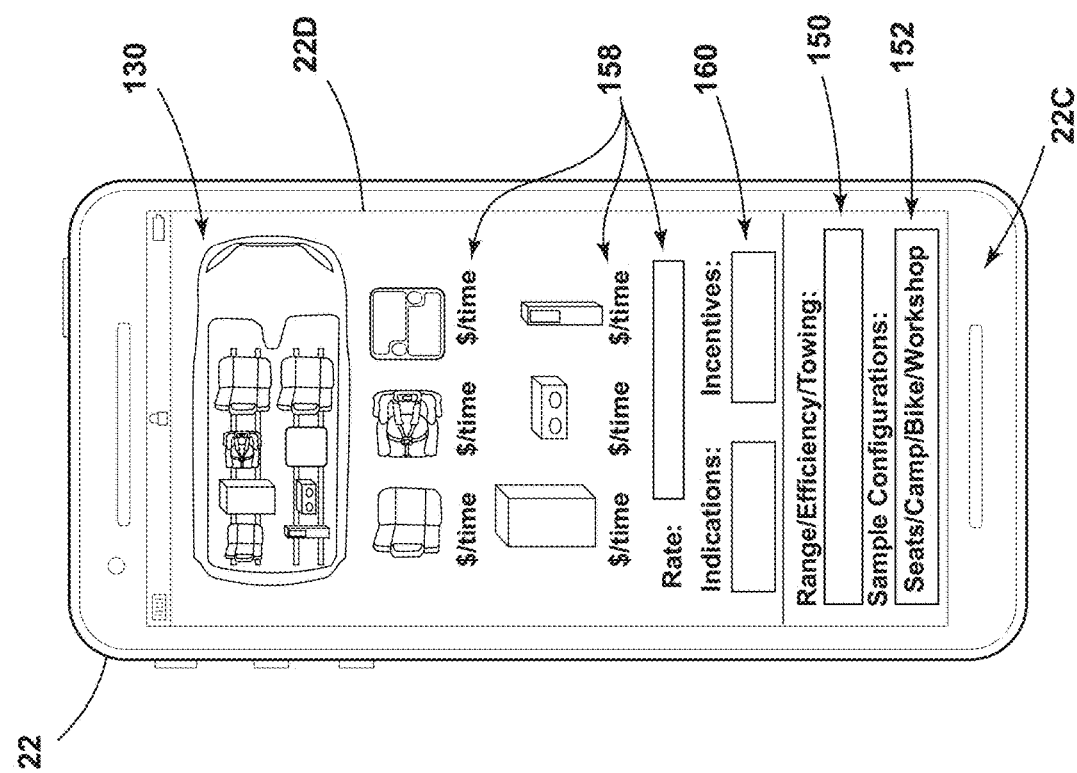

In embodiments, at least one of the computer server 24 and the electronic device 22 may be configured to cooperate/communicate, such as to generate a customized vehicle design 130 according to the user input (see, e.g., FIG. 8). For example and without limitation, the electronic device 22 may obtain information from the computer server 24 and provide at least some information to the user via the user interface 22C, and/or the electronic device 22 may receive information from a user via the user interface 22C and may provide at least some of that information to the computer server 24. The customized vehicle design 130 may include a particular configuration of removable components 40, such as within an interior of the vehicle 26 and/or connected to an exterior of the vehicle 26. The configuration may include the number of each type of component 40, the position of each component 40 (e.g., along one or more track assemblies 80/mounting surfaces 30), and/or the orientation of each component 40 (e.g., forward, rearward, angle between forward and rearward), as specified by the user.

With embodiments, a computer server 24 and/or an electronic device 22 may be configured to determine a validity of configurations from a user. For example, a computer server 24 and/or an electronic device 22 may restrict (e.g., prevent) movement of component models 112 into invalid positions in the interactive vehicle model 110 and/or may not generate or finalize (e.g., save, confirm, transmit, etc.) a customized vehicle design 130 if the configuration specified by the user is not valid.

With embodiments, a computer server 24 and/or an electronic device 22 may determine if a proposed configuration is physically possible for an actual component 40 in a vehicle 26. For example, a configuration including a removable component model 112 overlapping with or not at minimum distances from portions of the vehicle 26 or other removable components 40 may not be valid.

With embodiments, determining if a proposed configuration is valid may include determining if the positioning of any child seats 46 in the system is valid. For example, child seats 46 may not be permitted proximate the front of a vehicle 26 and/or may include required orientations (e.g., facing rearward), and configurations that include child seats 46 that are proximate the front of the vehicle or are not in required orientations may not be valid configurations.

In embodiments, determining if a proposed configuration is valid may include determining if the proposed configuration is electrically valid. Some components 40 may include electrical elements/loads that may have an associated current draw (e.g., expected, average, maximum, minimum etc.). A computer server 24 and/or an electronic device 22 may determine if a total current draw of the selected set of component models 112 exceeds a maximum current of a mounting surface 30, a track assembly 80, and/or portions of a track assembly 80. For example and without limitation, if a user attempts to add three component models 112 to a portion of a track assembly model 116 of the vehicle model 110 that have a combined/total current draw that exceeds the maximum current of that portion of the track assembly 80, the computer server 24 and/or the electronic device 22 may prevent the addition of the third component model 112 and/or may prevent creation/finalization of the customized vehicle design 130.

With embodiments, determining if a proposed component configuration is valid may include determining if the proposed configuration includes a valid safety device arrangement. For example, a vehicle 26 and/or one or more components 40 may include safety devices 140 (e.g., airbags, seatbelts, seatbelt pretensioners, etc.). For components 40 that include seats (e.g., vehicle seats 42, child seats 46), there may a certain minimum number and/or arrangement of safety devices 140, and/or safety devices 140 may include minimum clearances from components 40 and/or occupants thereof. A computer server 24 and/or an electronic device 22 may be configured to prevent creation/finalization of a customized vehicle design 130 including an invalid safety device arrangement.

In embodiments, determining if a proposed configuration is valid may include determining if the selected set of component models 112 is or will be available at a selected pickup location sufficiently in advance of a selected pickup time. A computer server 24 and/or an electronic device 22 may be configured to provide an indication to a user, such a via a display 22D, that one or more components 40 corresponding to the selected set of component models 112 will not be available at a selected location and time, and/or may prevent creation/finalization of the customized vehicle design 130 including such unavailable component models 112. For example, if a user selects more of a certain type of component model 112 (e.g., of seats 42) than are expected to be available (e.g., based on the expected return of other vehicles 26) or selects a component model 112 with features (e.g., color, massage, heating, etc.) that are not available, the computer server 24 and/or an electronic device 22 may be configured to provide an indication (e.g., text, audio, video, warning, etc.) to a user, such a via a display 22D, that components 40 corresponding to such component models 112 are not available and/or provide suggestions of similar components 40 that are available (e.g., may provide/display availability information). Additionally or alternatively, a computer server 24 and/or an electronic device 22 may be configured to provide an indication to a user, such a via a display 22D, of when currently unavailable components 40 will become available and/or other pickup locations/times where such components 40 are or will be available (e.g., availability information may include information regarding currently unavailable removable components 40).

With embodiments, determining if the components 40 corresponding to the selected set of component models 112 are or will be available at a selected pickup location sufficiently in advance of a selected pickup time may include determining if sufficient time is available to install the corresponding components 40 in a compatible vehicle 26 and/or remove components 40 from the compatible vehicle 26 that have not been selected. For example and without limitation, a computer server 24 and/or an electronic device 22 may include and/or obtain information including an expected installation time and/or removal time for each component 40, which may or may not be specific to certain vehicles 26 and/or orientations of the component 40.

With embodiments, a computer server 24 and/or an electronic device 22 may be configured to determine an effect on performance of a vehicle 26 by adding components 40 to a vehicle 26. For example and without limitation, the computer server 24 and/or the electronic device 22 may determine a change in fuel/energy efficiency (e.g., miles per gallon, kilometers per liter, miles per gallon equivalent, kilowatt hours per 100 miles, etc.), vehicle range (e.g., miles, kilometers, etc.), and/or towing capacity (see, e.g., FIG. 8). A computer server 24 and/or an electronic device 22 may, for example, include and/or obtain information about the weight and/or power draw of a component 40 and may determine/update an expected/estimated efficiency, range, and/or towing capacity according to the increase in weight and/or current draw associated with a component 40 when added to a vehicle 26 (or decrease when the component 40 is removed). For example and without limitation, if a user adds a model 112 of component 40 that includes an electrical appliance 50 (e.g., a refrigerator) to a vehicle model 110, the computer server 24 and/or the electronic device 22 may reduce the expected/estimated efficiency, range, and/or towing capacity of the vehicle 26. The computer server 24 and/or the electronic device 22 may provide performance information 150, such as via the display 22D, of the effects of the proposed changes, and/or may prevent configurations that would reduce expected/estimated efficiency, range, and/or towing capacity below minimum thresholds, which may be set by the user, a vehicle manufacturer, and/or a governmental authority, for example.

In embodiments, such as generally illustrated in FIG. 8, a computer server 24 and/or an electronic device 22 may include one or more sample or suggested configurations 152 and may present such configurations 152 to the user for selection. The one or more suggested configurations 152 may, for example and without limitation, include a maximum seating configuration (e.g., a configuration allowing for the most occupants), a biking configuration (e.g., with two bike racks), a workshop configuration (e.g., with one or more tables 44, power plugs/outlets 48, a single seat 42), a camping configuration (e.g., with covers 64, tents 68, beds, appliances 50, etc.), one or more of the most common configurations selected by users (e.g., all users, users at the particular pick up location, users at the time of year, etc.), and/or configurations previously selected by the user, among other configurations. Upon selection of a suggested configuration by the user, the computer server 24 and/or the electronic device 22 may load component models 112 into the vehicle model 110. The user may then accept the suggested configuration as the custom vehicle design 130, or may modify the suggested configuration.

With embodiments, initially, an interactive vehicle model 110 may include one or more component models 112 disposed in a sample configuration. The electronic device 22 may be configured to allow a user to modify the sample configuration, such as via removing one or more component models 112 from, adding one or more component models 112 to, and/or changing an initial or default orientation of component models 112 of the interactive vehicle model 110.

In embodiments, a computer server 24 and/or an electronic device 22 may be configured to allow a user to reserve one or more additional or spare components 40. For example, a user may desire a first component configuration for a first part of a use/rental period (e.g., maximum seating during the week) and a second component configuration for a second part of the use/rental period (e.g., a camping configuration on the weekend). In some instances, the additional components 40 may be provided along with the initial components 40, such as in a cargo area of the vehicle 26. A computer server 24, an electronic device 22, and/or a vehicle electronic device 142 may be configured to provide instructions to the user on how to remove components 40 (e.g., components 40 in the first configuration) and/or install components 40 (e.g., components in the second configuration), such as on a display 22D of the electronic device 22 and/or a display 144 of the vehicle electronic device 142.

With embodiments, a computer server 24 and/or an electronic device 22 may be configured to allow a user to reserve one or more components 40 without reserving a vehicle 26. For example and without limitation, if a user already has access to (e.g., owns, leases, borrows, rents elsewhere, etc.) a vehicle 26, a user may utilize an electronic device 22 and/or a vehicle electronic device 142 to reserve one or more components 40.

With embodiments, a computer server 24, an electronic device 22, and/or a vehicle electronic device 142 may be configured to monitor and/or control, at least in part/indirectly, movement and/or connection of components 40 in a vehicle 26. For example, if a user attempts to move or add components 40 in a manner that would result in an invalid configuration, the computer server 24, the electronic device 22, and/or the vehicle electronic device 142 may prevent power from being provided to the components 40, may prevent movement of the vehicle 26, and/or may provide an indication to the user, such on a display 22D of the electronic device 22 and/or a display 144 of the vehicle electronic device 142, of the invalid configuration. In embodiments, a vehicle electronic device 142 may monitor the components 40 in a vehicle 26 and may provide current configuration information to the electronic device 22 and/or the computer server 24, which may determine the validity of the configuration. The computer server 24 and/or the electronic device 22 may be configured to provide an indication to the vehicle electronic device 142 that the current configuration is invalid, and the vehicle electronic device 142 may prevent movement/operation of the vehicle 26.

Figure 9:
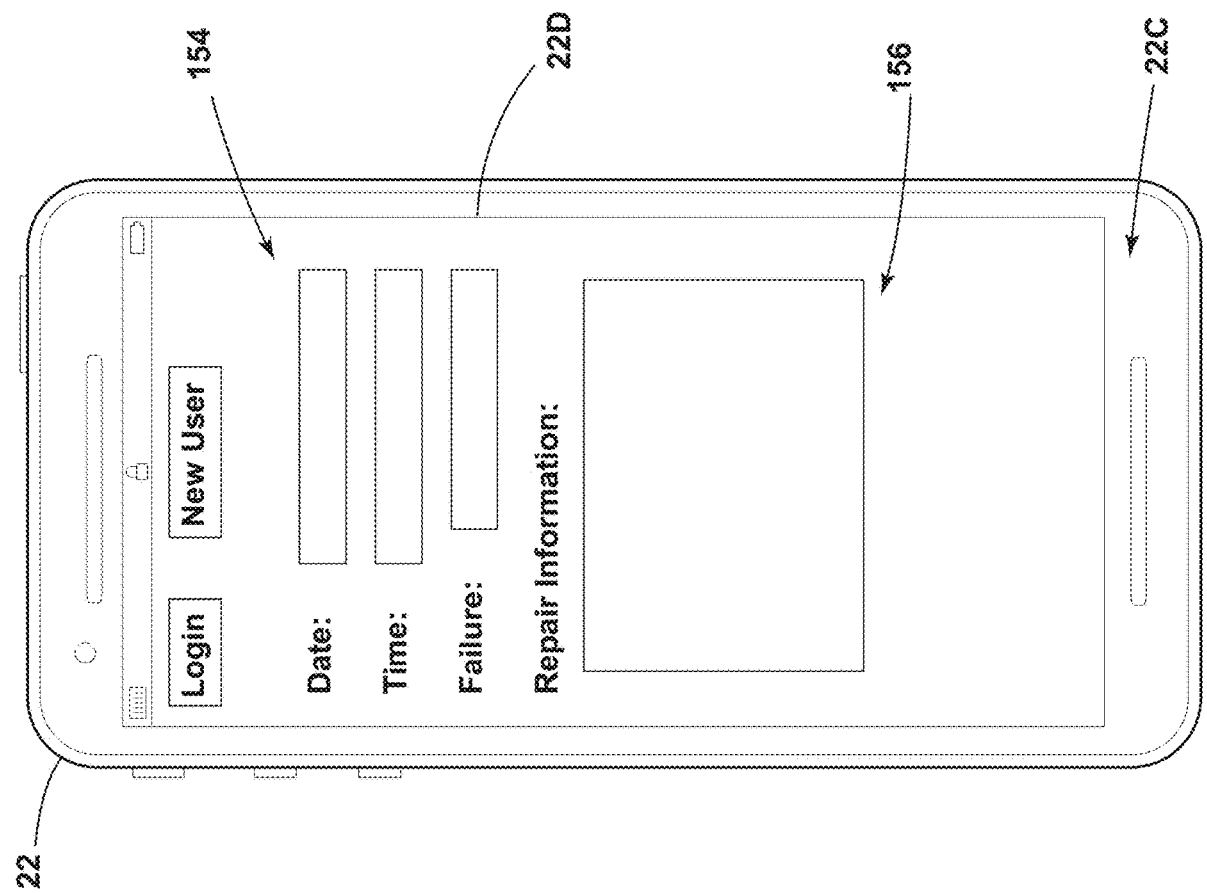

With embodiments, such as generally illustrated in FIG. 9, a computer server 24, an electronic device 22, and/or a vehicle electronic device 142 may be configured to detect and/or receive information regarding failures or malfunctions of a vehicle 26 and/or components 40 thereof, such as while a user is renting the vehicle 26 and/or components 40.

For example and without limitation, a user may provide failure information 154 via the electronic device 22 and/or the vehicle electronic device 142, which may provide the failure information to the computer server 24. The computer server 24, the electronic device 22, and/or the vehicle electronic device 142 may be configured to determine if the failure requires immediate repair (e.g., is related to vehicle operation and/or safety) or can be repaired at a later time (e.g, an aesthetic or convenience item, such as interior lighting and/or an appliance failure). The computer server 24, the electronic device 22, and/or the vehicle electronic device 142 may be configured to identify one or more nearby repair locations and provide information 156 (e.g., address, directions, hours, etc.) regarding the repair locations to the user. The computer server 24, the electronic device 22, and/or the vehicle electronic device 142 may be configured to compensate the user for the failed component 40 and/or the time spent by the user to obtain a repair, such as via refunding the user and/or crediting an account of the user. The computer server 24, the electronic device 22, and/or the vehicle electronic device 142 may be configured to determine if the failure was a malfunction or was the result of misuse by a user. For example and without limitation, certain failures may be considered malfunctions (e.g., a light burning out) while other failures may be considered misuse or abuse (e.g., a component 40 that has been physically damaged), and if the user selects a failure that is considered misuse or abuse, the computer server 24, the electronic device 22, and/or the vehicle electronic device 142 may be configured to charge the account of the user for the damage.

Figure 11:
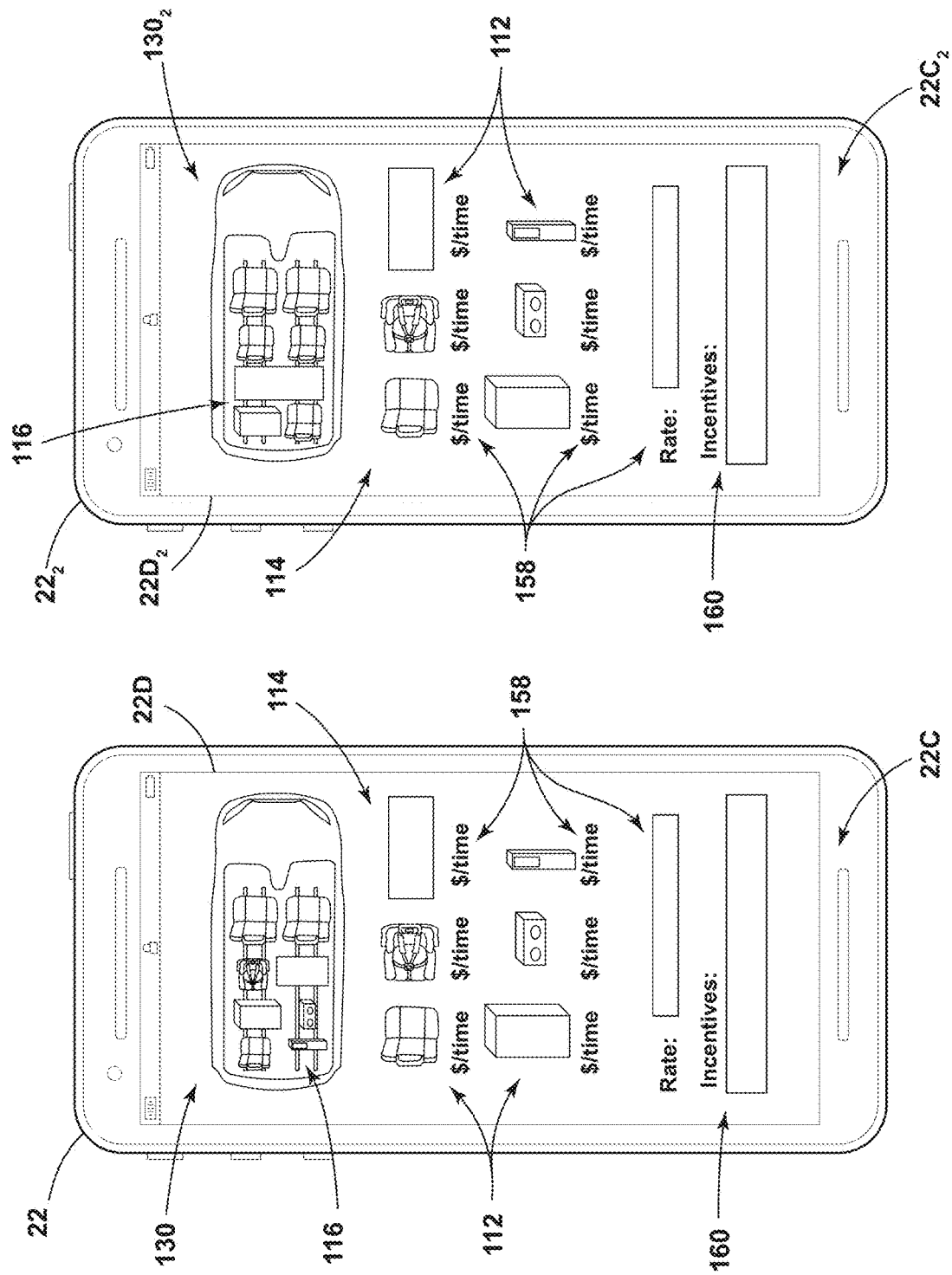
FIG. 11 is a representation generally illustrating embodiments of a first electronic device and a second electronic device each having a display according to teachings of the present disclosure.

With embodiments, such as generally illustrated in FIGS. 8 and 11, a computer server 24, an electronic device 22, and/or a vehicle electronic device 142 may be configured to provide rate information 158 and/or incentive information 160 to a user. For example and without limitation, the electronic device 22 may display rate information for a customized vehicle design, rate information for types of vehicles 26, and/or rate information for various components 40. The rate information may, in some instances, be displayed with and/or adjacent to models 110, 112 of the vehicles 26 and/or components 40. The rate information 158 may be automatically updated, such as while a user creates the customized vehicle design 130 so that the user receives rate change feedback (e.g., substantially immediately) upon making a change to the design 130. In embodiments, the computer server 24 may include rate information 158 and provide the rate information 158 to the electronic device 22 for the electronic device 22 to determine the changes in rate as the user makes changes. Additionally or alternatively, the electronic device 22 may provide design change information to the computer server 24, and the computer server 24 may provide updated rate information 158 for the electronic device 22 to display as design changes are made.

In embodiments, incentive information 160 may include rental rate reductions for modifications to the customized vehicle design 130, rental rate reductions and/or refunds for delays (e.g., if a vehicle 26 or component 40 is not ready at the designated time), and/or bonuses for upgrading vehicle type, component type, and/or the number of components 40, among others.

With embodiments, an electronic device 22 and/or a vehicle electronic device 142 may be configured to control one or more functions of components 40. For example and without limitation, an electronic device 22 and/or a vehicle electronic device 142 may be configured to control, at least in part, operation of an actuator 170 of a component 40, such as an electric motor of the component 40 to move the component 40 along a track assembly 80.

In embodiments, an electronic device 22 may be configured to request, obtain, and/or receive user feedback, such as regarding a reserved vehicle 26 and/or one or more reserved components 40.

With embodiments, a computer server 24, an electronic device 22, and/or a vehicle electronic device 142 may be configured to monitor usage of one or more components 40, such as to determine which components 40 are used by a user. For example, a component 40 including a seat 42 may be considered to be used if an occupancy sensor 172 detects that the seat 42 is occupied, and/or a component 40 including an appliance 50 may be considered to be used if the appliance 50 is turned on (e.g., consumes power). Additionally or alternatively, monitoring usage may include determining how much a component 40 was used (e.g., time, power usage, etc.) and/or if a component 40 was used properly, improperly, and/or in an unexpected manner.

In embodiments, an electronic device 22 may be configured to provide information/indications corresponding to features of a vehicle 26 and/or components 40 thereof. For example and without limitation, the electronic device 22 may identify nearby vehicle chargers compatible with the vehicle 26 and/or may identify nearby pet-friendly parks and/or lodging if a component 40 of the vehicle 26 includes a pet crate 58.

With embodiments, upon a user providing a vehicle 26 to a drop off location, a computer server 24, an electronic device 22, and/or a vehicle electronic device 142 may be configured to determine (e.g., automatically) if the vehicle 26 includes all of the components 40 that the vehicle 26 included with the vehicle 26 when it was picked up. For example and without limitation, a vehicle electronic device 142 may be configured to obtain information about some or all components 40 in the vehicle 26, and may provide that information to the electronic device 22 and/or the computer server 24, which may compare the information to initial information about the components 40 when the vehicle 26 was picked up (e.g., to the customized vehicle design 130).

With embodiments, a computer server 24, an electronic device 22, and/or a vehicle electronic device 142 may be configured to determine if components 40 are properly connected to a vehicle 26, such as mechanically and/or electrically. The computer server 24, the electronic device 22, and/or the vehicle electronic device 142 may check for proper connections periodically and/or if certain events occur (e.g., a new component 40 is detected in proximity to the vehicle 26, vehicle activation/ignition, etc.). A system for determining a proper connection is generally described in U.S. patent application Ser. No. 17/078,706, filed Oct. 23, 2020, the disclosure of which is hereby incorporated by reference as though fully set forth herein.

In embodiments, a computer server 24, an electronic device 22, and/or a vehicle electronic device 142 may be configured to selectively provide access to one or more functions of a component 40 depending on input from the user. For example and without limitation, the electronic device 22 may display information about functions of a component 40 (e.g., actuators 170 of a vehicle seat 42) and/or the rate information 158 may include information about the rate for access to such functions. For example and without limitation, an actuator 170 of a vehicle seat 42 may include a heater and the rate information 158 may include a rate for enabling the heater. If the user selects the heater function, the computer server 24, the electronic device 22, and/or the vehicle electronic device 142 may be configured to enable the heater for that vehicle seat 42 and the total rate for the vehicle 26 may be increased by the heater rate.

With embodiments, an application 180 may be stored on an electronic device 22 (e.g., on a memory 22B) and/or on a computer server 24 (e.g., on a memory 24B) that may include instructions that, when executed by a processor 22A, 24A, are configured to carry out and/or facilitate one or more activities or functions described above with respect to an electronic device 22 and/or a computer server 24. The application 180 may, for example and without limitation, be a smartphone application that may be available via one or more application interfaces/stores, such as the Apple App Store and/or the Google Play Store, among others.

Figure 10:
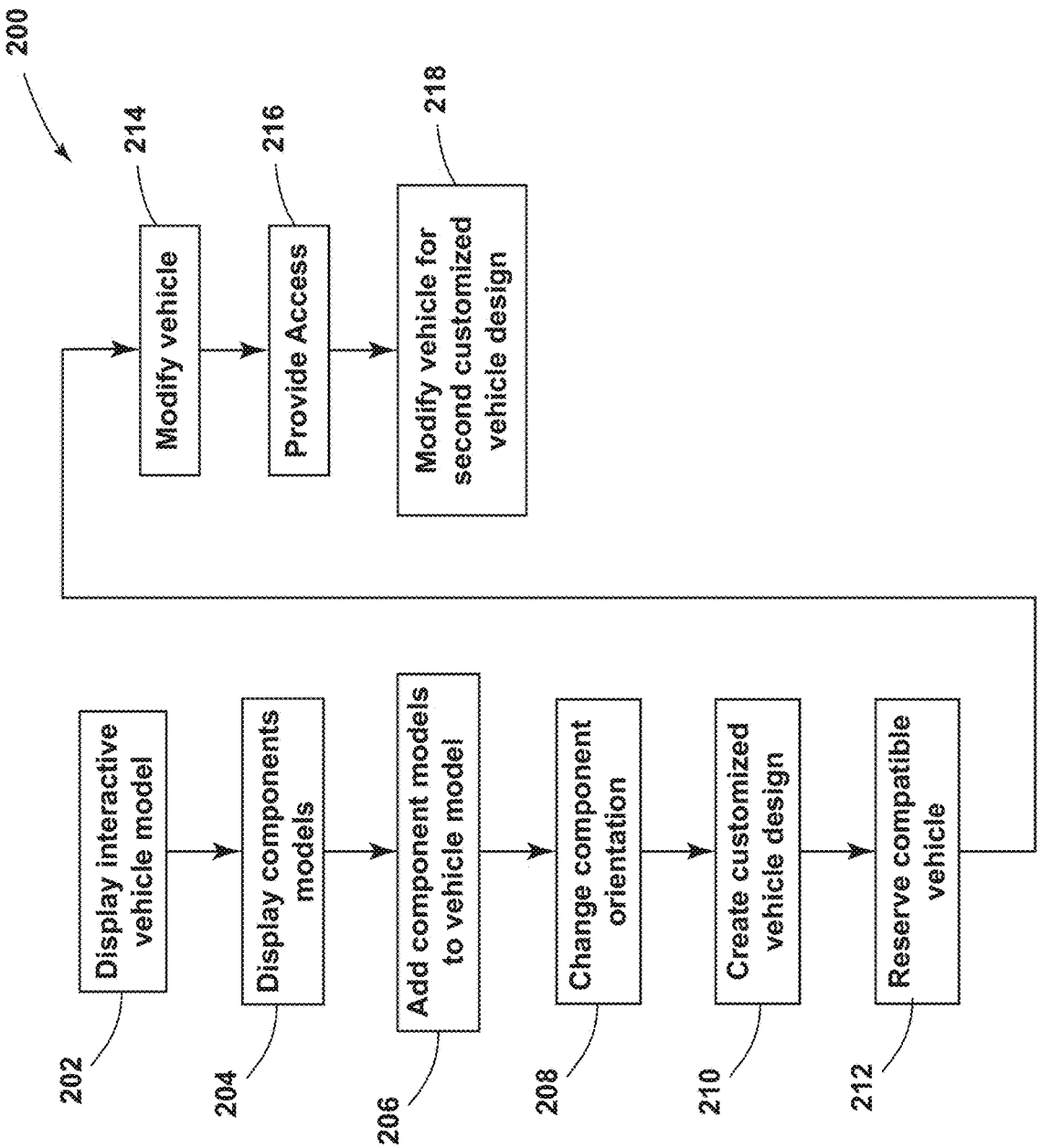
FIG. 10 a flow diagram generally illustrated an embodiment of a method of operating a vehicle system according to teachings of the present disclosure.

In embodiments, such as generally illustrated in FIG. 10, a method 200 of using a vehicle system 20 for customizing components 40 of a vehicle 26 for temporary use may include displaying, on a display 22D of an electronic device 22, an interactive vehicle model 110 (block 202), displaying, on the display 22D, a plurality of models 112 of removable components 40 configured for selective connection with the vehicle 26 in a plurality of locations (block 204), adding a set of the plurality of models 112 of components 40 to the interactive vehicle model 110 in respective locations of the plurality of locations (block 206), changing a default orientation of at least one model 112 of the set of models 112 (block 208), and/or creating a customized vehicle design 130 with the set of models (block 210). Creating the customized vehicle design 130 may, for example, include determining if a selected configuration is valid, providing a warning or indication to a user of invalid configurations, indications of expected efficiency reductions, providing rate information, providing incentive information, and/or other indications/information to the user.

With embodiments, the interactive vehicle model 110 and the plurality of models 112 may be displayed simultaneously on the display 22D of the electronic device 22. The method 200 may include preventing the addition of component models 112 of the plurality of component models 112 to the interactive vehicle model 110 in incompatible locations of the plurality of locations. The method 200 may include reserving, via the electronic device 22, a vehicle 26 compatible with the customized vehicle design 130, including the components 40 corresponding to the selected component models 112, for temporary operation by a user associated with the electronic device 22 (block 212). The method 200 may include modifying the compatible vehicle 26 to match the customized vehicle design 130 (block 214), which may include at least one of (i) adding components 40 corresponding to the set of models 112 to the compatible vehicle 26, (ii) removing components 40 not corresponding to the set of models 112 from the compatible vehicle 26, (iii) modifying an existing orientation of a component 40 in the compatible vehicle 26 to match a model 112 of the set of models 112, and/or (iv) modifying an existing position of a component 40 to match a model 112 of the set of models 112. The method 200 may include providing access to the compatible vehicle 26 for said user to operate temporarily to conduct travel (block 216). The compatible vehicle 26 may substantially match the customized vehicle design 130.

In embodiments, such as generally illustrated in FIGS. 10 and 11, the method 200 may include modifying the compatible vehicle 26 to match a second customized vehicle design 1302 that may be associated with a second user (e.g., after the first user returns the vehicle 26 that was modified to match the first customized vehicle design 130) (block 218). For example, a second user may utilize a second electronic device 22$_2$ to create the second customized vehicle design 1302, and the vehicle 26 compatible with the first customized vehicle design 130 may also be compatible with the second customized vehicle design 1302 (see, e.g., FIG. 11). The second customized vehicle design 1302 may be different than the first customized vehicle design 130.

With embodiments, communication between the electronic device 22 and the computer server 24 may include the electronic device 22 conducting most of the method 200 (e.g., the computer server 24 may provide initial data and most other steps may be conducted via the electronic device 22). In other embodiments, communication between the electronic device 22 and the computer server 24 may include the computer server 24 conducting most of the method 200 (e.g., the electronic device 22 may act/function as a user interface for the computer server 24, with most of the steps of the method 200 conducted via the computer server 24, such as conducting determinations/validations). In some embodiments, communication between the electronic device 22 and the computer server 24 may include the electronic device 22 and the computer server 24 cooperating to conduct one or more steps of the method 200, and/or may include the electronic device 22 and the computer server 24 conducting the method 200 in a balanced manner (e.g., without either the electronic device 22 or the computer server 24 conducting a significant majority of the method 200).

In examples, a server and/or an electronic device (e.g., computer server 24, electronic devices 22, 22$_2$, vehicle electronic device 142) include an electronic controller and/or include an electronic processor, such as a programmable microprocessor and/or microcontroller. In embodiments, a server and/or an electronic device may include, for example, an application specific integrated circuit (ASIC). A server and/or an electronic device may include a central processing unit (CPU), a memory (e.g., a non-transitory computer-readable storage medium), and/or an input/output (I/O) interface. A server and/or an electronic device may be configured to perform various functions, including those described in greater detail herein, with appropriate programming instructions and/or code embodied in software, hardware, and/or other medium. In embodiments, a server and/or an electronic device may include a plurality of controllers. In embodiments, a server and/or an electronic device may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer server, an electronic device, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A vehicle system for providing access to removable vehicle components, the vehicle system comprising:
   one or more vehicles having customizable configurations and configured for selective connection with a plurality of removable components, the plurality of removable components including a vehicle seat;
   an electronic device associated with a user and configured to display an interactive vehicle model of the one or more vehicles; and
   a computer server configured to communicate with the electronic device;
   wherein the electronic device is configured to facilitate user selection of one or more removable components of the plurality of removable components for the one or more vehicles via providing virtual models of the plurality of removable components to said user for selection;
   the electronic device is configured to receive user input from said user, said user input including a selection of the virtual models, desired positions of each of the individual selected virtual models, and desired orientations of each of the individual selected virtual models relative to the interactive vehicle model; and
   the computer server and the electronic device are configured to communicate to:
      generate a customized vehicle design according to the selection of the virtual models, the desired positions, and the desired orientations;
      identify a compatible vehicle of the one or more vehicles that is compatible with the customized vehicle design; and
      reserve the compatible vehicle and removable components of the plurality of removable components corresponding to the selection of virtual models for said user for temporary access and operation.

2. The vehicle system of claim 1, wherein the electronic device is configured to:
   receive second user input from a second user, said second user input including a second selection of the virtual models, desired positions of the selected virtual models, and desired orientations of the selected virtual models;
   wherein the computer server and the electronic device are configured to communicate to:
   generate a second customized vehicle design according to the second selection of the virtual models, the desired positions, and the desired orientations;
   identify the compatible vehicle, which was compatible with the customized vehicle design, as compatible with the second customized vehicle design; and reserve the compatible vehicle and removable components of the plurality of removable components corresponding to the second selection of virtual models for said second user for temporary access and operation.

3. The vehicle system of claim 1, wherein the electronic device is configured to:
simultaneously display the virtual models of the plurality of removable components and the interactive vehicle model on a display of the electronic device; and
allow said user to individually move the virtual models of the plurality of removable components relative to the interactive vehicle model to compatible positions in the interactive vehicle model; and
allow said user to individually modify an orientation of the virtual models of the plurality of removable components in the interactive vehicle model.

4. The vehicle system of claim 3, wherein moving the virtual models of the plurality of removable components to compatible positions in the interactive vehicle model includes said user selecting the virtual models of the plurality of removable components from a library and selecting respective individual locations for the selected virtual models on the interactive vehicle model.

5. The vehicle system of claim 4, wherein the interactive vehicle model initially includes a set of the virtual models disposed in a sample configuration; and
the electronic device is configured to allow said user to modify the sample configuration, including via removing one or more virtual models of the set of the virtual models from the interactive vehicle model.

6. The vehicle system of claim 1, wherein the plurality of removable components includes electrical components and non-electrical components.

7. The vehicle system of claim 1, wherein at least some of the plurality of removable components are configured for selective connection with, movement along and relative to, and removal from track assemblies of the one or more vehicles; and
the track assemblies are configured for electrical connection with the plurality of removable components.

8. The vehicle system of claim 1, wherein at least one of the computer server and the electronic device is configured to determine if the customized vehicle design is feasible.

9. The vehicle system of claim 8, wherein the electronic device is configured to provide an indication to said user if the customized vehicle design is not feasible; and
at least one of the electronic device and the computer server is configured to prevent finalization of the customized vehicle design if the customized vehicle design not feasible.

10. The vehicle system of claim 8, wherein determining if the customized vehicle design is feasible includes determining if the customized vehicle design is compatible with safety devices.

11. The vehicle system of claim 1, wherein the electronic device is configured to display availability information of currently unavailable removable components of the plurality of removable components, the availability information including when the unavailable removable components are expected to be available and/or other locations where the unavailable components are or will be available.

12. A method of using the vehicle system of claim 1, the method comprising:
displaying, on a display of the electronic device, the interactive vehicle model of a vehicle of the one or more vehicles;
displaying, on the display, the virtual models of the plurality of removable components, the plurality of removable components configured for selective connection in a plurality of locations of the vehicle;
adding a set of models of the virtual models of the removable components to the interactive vehicle model in respective locations of the plurality of locations;
changing a default orientation of at least one model of the set of models; and
creating the customized vehicle design with the set of models.

13. The method of claim 12, wherein the interactive vehicle model and the virtual models are displayed simultaneously on the display of the electronic device.

14. The method of claim 12, including preventing addition of models of the virtual models to the interactive vehicle model in incompatible locations of the plurality of locations.

15. The method of claim 12, including reserving, via the electronic device, the compatible vehicle that is compatible with the customized vehicle design and the removable components of the plurality of removable components corresponding to the set of models for said user associated with the electronic device.

16. The method of claim 15, including modifying the compatible vehicle to match the customized vehicle design via at least one of (i) adding removable components corresponding to the set of models to the compatible vehicle, (ii) removing removable components not corresponding to the set of models from the compatible vehicle, (iii) modifying an existing orientation of a removable component corresponding to the set of models, or (iv) modifying an existing position of a removable component corresponding to the set of models.

17. The method of claim 16, including providing access to the compatible vehicle for said user to operate temporarily to conduct travel, the compatible vehicle matching the customized vehicle design.

18. The method of claim 17, including modifying the compatible vehicle to match a second customized vehicle design associated with a second user; and
wherein the second customized vehicle design is different than the customized vehicle design.

19. A vehicle system for providing access to removable vehicle components, the vehicle system comprising:
one or more vehicles having customizable configurations and configured for selective connection with a plurality of removable components, the plurality of removable components including a vehicle seat;
an electronic device associated with a user and configured to display an interactive vehicle model of the one or more vehicles; and
a computer server configured to communicate with the electronic device;
wherein the electronic device is configured to facilitate selection by said user of one or more removable components of the plurality of removable components for the one or more vehicles via providing virtual models of the plurality of removable components to said user for selection;
the computer server and the electronic device are configured to communicate to generate a customized vehicle design according to user selection of the virtual models;
at least one of the computer server and the electronic device is configured to determine if the customized vehicle design is feasible; and
determining if the customized vehicle design is feasible includes determining if a current draw of the removable components of the plurality of removable components corresponding to the user selection of the virtual models would exceed a maximum current.

20. The vehicle system of claim 19, wherein the electronic device is configured to:
receive user input from said user, said user input including a selection of the virtual models, desired positions of each of the individual selected virtual models, and desired orientations of each of the individual selected virtual models relative to the interactive vehicle model;
wherein the computer server and the electronic device are configured to communicate to:
generate the customized vehicle design according to the selection of the virtual models, the desired positions, and the desired orientations;
identify a compatible vehicle of the one or more vehicles that is compatible with the customized vehicle design; and
reserve the compatible vehicle and removable components of the plurality of removable components corresponding to the selection of virtual models for said user for temporary access and operation.

* * * * *